J. & C. J. BAMFORD.
COMBINED SIDE DELIVERY HAY RAKE, TEDDER, AND SWATH TURNER.
APPLICATION FILED JUNE 16, 1915.
1,239,153.
Patented Sept. 4, 1917.
2 SHEETS—SHEET 2.
FIG. 2
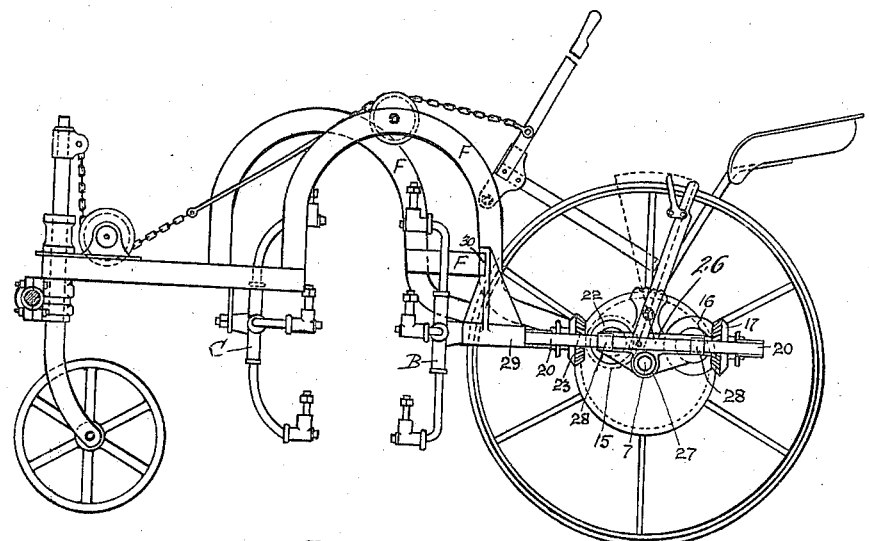
FIG. 3.
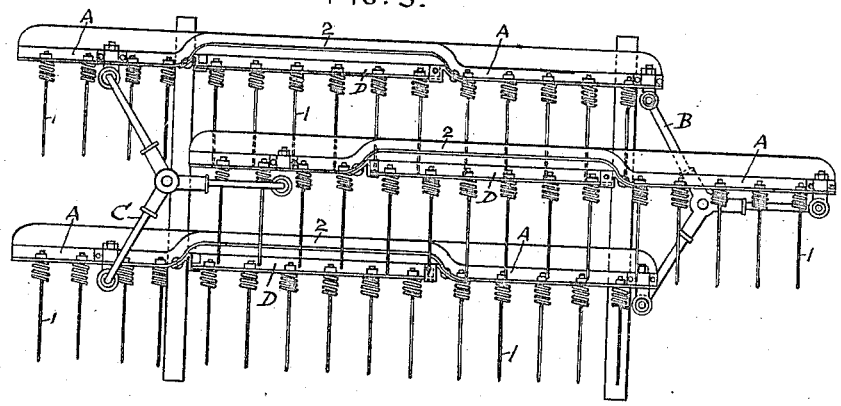
FIG. 5.  FIG. 4.  FIG. 6
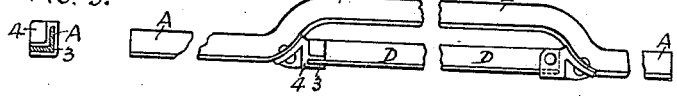
FIG. 7.
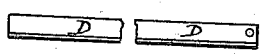
INVENTORS:
Joseph Bamford
Cyril Joseph Bamford
By Wallace White
ATT'Y.

UNITED STATES PATENT OFFICE.

JOSEPH BAMFORD AND CYRIL JOSEPH BAMFORD, OF UTTOXETER, ENGLAND.

COMBINED SIDE-DELIVERY HAY RAKE, TEDDER, AND SWATH TURNER.

1,239,153.          Specification of Letters Patent.      Patented Sept. 4, 1917.

Application filed June 16, 1915. Serial No. 34,391.

*To all whom it may concern:*

Be it known that we, JOSEPH BAMFORD and CYRIL JOSEPH BAMFORD, both residing at St. Mary's Mount, Uttoxeter, in the county of Stafford, England, subjects of His Majesty the King of Great Britain and Ireland, have invented certain new and useful Improvements in Combined Side-Delivery Hay Rakes, Tedders, and Swath Turners, of which the following is a specification.

This invention has reference to combined side delivery hay rakes, tedders and swath turners of that class in which the rake bars furnished with the pendant tines are carried by and between two eccentrically placed revolving reels or spiders or the like and have combined rotary and endwise movements imparted to them across the path of the machine, the tines always pointing toward the ground at every part of their revolution. Our invention consists of certain improvements to enable machines of this class to be converted into and used as either a side delivery rake, or a swath turner or as a combined side delivery rake, a swath turned or a tedder. Heretofore said combined side delivery hay rakes, tedders and swath turners have been so constructed as to be capable of being drawn only in one direction generally with the reels and rake bars at the back of the machine, said reels and rake bars being arranged to revolve in one direction for side-raking and in the opposite direction for tedding.

According to one of our said improvements in order to enable a side delivery rake of the said class to be used either for side raking or for swath turning we raise or bridge the central portion of each of the rake bars above its points of support on the reels or spiders or the like so as to enable the rake bars to pass over the swaths when swath turning, this raised or bridged portion not having any tines when swath turning, the said tines being (when the machine is used for swath turning) only provided on the remaining end portions of each of the rake bars. We provide a make up bar with tines upon it adapted to be readily attached to or detached from the rake bar so as to close up the opening or bridge. When the machine is to be used for side raking then there must be a continuous row of tines along each rake bar which is accomplished by the make up bars being fixed to the rake bars so as to close the bridge opening; or instead of the make up bars long tines may be fixed to the higher or bridge portions of the rake bars. When the machine is to be used as a swath turner then the make up bars with their tines are taken away from the central portion of each of the rake bars, or the separate long tines are removed from the higher bridge portions of the rake bars, and the two swaths are turned at the same time by the end portions of the rake bars, (the slower speed preferably being for this operation) the raised or bridged portions of the rake bars passing clear over the swaths.

According to another of our said improvements in the said class of machines we provide a combined side delivery rake, tedder and swath turner in which the rake bars will always revolve in the same direction whether the machine is used for side-raking or for tedding, means being provided for rotating the rake bar at a higher speed for tedding than for side-raking. To accomplish this purpose we employ one of the said side delivery hay rakes in which the rake bars are arranged in front of the road wheels for side-raking so that the hay is gathered in front of the machine and delivered at one side thereof as the machine is drawn forward. We so arrange this machine that in addition to its being capable of being drawn in one direction with the rake bars and their accessories in front of the road wheels for side-raking, the said machine can also be drawn in the opposite direction, that is with the rake bars and their accessories at the back of the road wheels for tedding, so as to leave the tedded hay behind the machine, the rake bars being arranged to revolve in the same direction whether the machine is used for side-raking or for tedding and thus the hay is under both conditions thrown clear of the road wheels and the rake bars can be arranged comparatively near to the road wheels with their ends projecting beyond the track of the road wheels on each side which enables the machine to follow ridge and furrow better than in other machines in which the rake bars have to be arranged farther from the road wheels owing to their revolving in the direction to throw the hay toward the road wheels. The frame of the machine has to have both at the front and at the back suitable connections for the horse tackle, also the driver's seat has to be so mounted and arranged that it can be turned and fixed to face in either direction.

Our invention is illustrated by the accompanying drawings of which:—

Fig. 2 is a side elevation of the said machine but without the rakes;

Fig. 3 is a back elevation of the rake bars and spiders of the said machine;

Fig. 4 is a front elevation of one of the rake bars of the said machine with the make-up bar drawn on an enlarged scale;

Fig. 5 is a cross sectional elevation of the make-up bar and showing in end elevation the attachment bracket by which this end of the make-up bar is secured to the central gap part of the rake bar;

Fig. 6 is a cross sectional elevation of the make-up bar and the connecting bracket which connects the other end of the make-up bar to the rake bar and Fig. 7 is a front elevation of the make-up bar separately.

Figure 1:
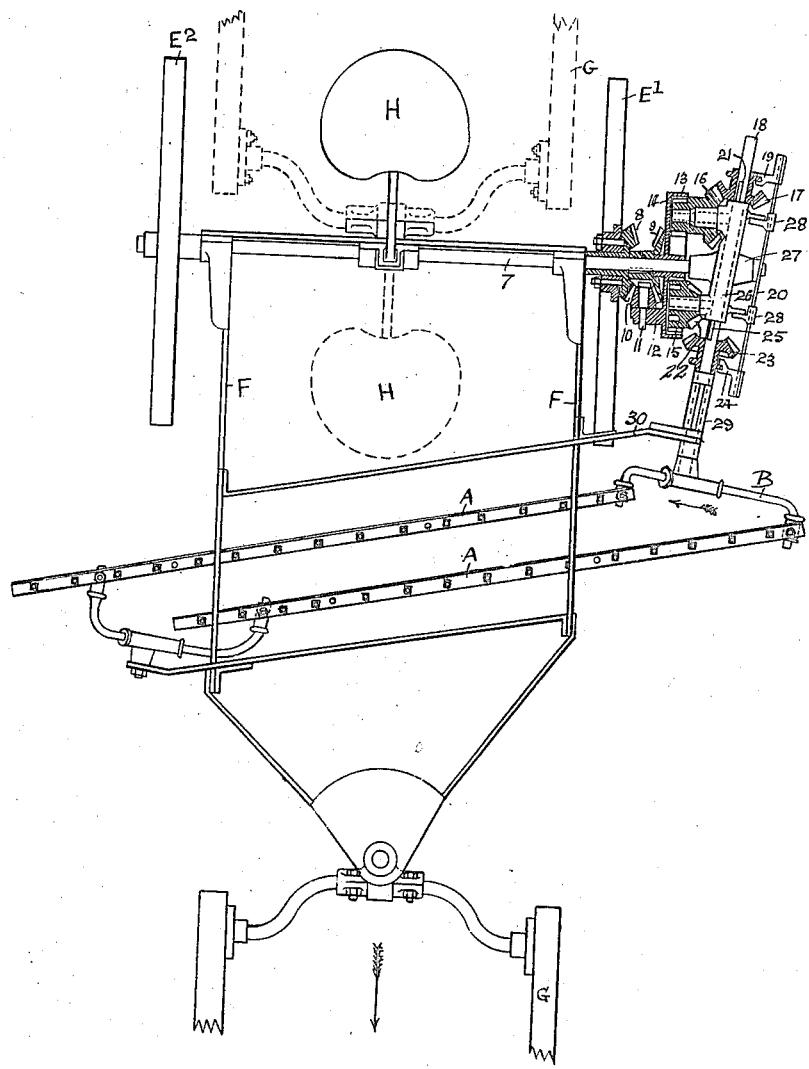
Figure 1 is a part sectional plan of a combined side delivery hay rake, swath turner and tedder embodying our invention, only such parts however being shown as are necessary to illustrate our invention.

Referring to the drawings the rake bars are marked A and the two eccentrically placed revolving reels or spiders or the like by which the rake bars are carried are marked respectively B and C, these reels, spiders or the like imparting to the rake bars a combined rotary and endwise movement across the path of the machine as is well known, the tines 1 always pointing toward the ground at every part of their revolution. According to this invention each of the rake bars A has its central portion 2, for a length equal to say six of the tines, raised or bridged above its points of suspension and made without any tines, these being provided as shown in Fig. 3 only for a certain length of the remaining end portions of each of the rake bars. Each rake bar A is provided with a make-up bar D which may be made in one or more lengths furnished with any convenient number, say six depending tines, this make-up bar being adapted to be fitted in the opening or bridge so as to close up the same and thus make a continuous rake bar as in Fig. 4. Thus when the machine is to be used for side raking then the make-up bars D are fixed to the rake bars so as to close the bridges or openings and make a continuous row of tines along each rake bar as in Fig. 3, but on the other hand when the machine is to be used as a swath turner to turn two swaths, then the make-up bars D with their tines are taken away from the central portions of each of the rake bars A and the two swaths are turned at the same time by the tines on the end portions of the rake bars, the raised or bridge portion 2 of the rake bars which have no tines passing clear over the swaths. Any convenient means can be adopted for removably securing the make-up bars D to the rake bars but what we prefer is for one end of the make-up bar D (which bar is preferably of angle section of corresponding section to the rake bars) to fit into an angle section slot 3 which is formed in a bracket 4 which is fixed to one side of the bridge of the rake bar (see Figs. 4 and 5) the other end of the make-up bar fitting on to a bracket 5 which is permanently fixed to the other side of the bridge, this end of the make-up bar being fixed to the bracket by a cross bolt 6, so that when this bolt 6 is removed the corresponding end of the bar D can be detached from the bracket 5 and then moved endwise through a short space to withdraw its other end from the slot in the bracket 4, and thus the make-up bar D is entirely free.

When the rake bars A are arranged in front of the road wheels $E^1$, $E^2$ for side raking so that the hay is gathered in front of the machine and delivered at one side of the same (say the left side of the machine in Fig. 1) as the machine is drawn forward in the direction of the arrow on the left hand side of Fig. 1, the machine is so arranged that it can also be drawn in the opposite direction, that is toward the right hand of Fig. 1 with the rake bars A and their accessories at the back of the road wheels $E^1$, $E^2$ for tedding so as to leave the tedded hay behind the machine and the driving gear which transmits rotary motion and power from the road wheel to the driving reel or spider B is so arranged that the rake bars A revolve in the same direction whether the machine is used for side raking (traveling toward the left hand in Fig. 1) or for tedding (traveling toward the right hand in Fig. 1) so that the hay is under both conditions thrown clear of the road wheels with the ends of the rake bars A projecting beyond the track of the road wheels on each side of the machine.

We will now describe the preferred arrangement of driving and differential gear which we employ for transmitting rotary motion and power from the road wheels $E^1$ to the axle 18 of the driving reel B so as to cause the rake bars A to revolve in the same direction for side raking as for tedding but in the latter case at a higher speed and also to allow the road wheels to revolve at different speeds when the machine is turning or moving around a curve. The road wheel axle 7 is fixed to the machine frame and does not rotate but the road wheel $E^2$ revolves loosely thereon. The other road wheel $E^1$ is mounted and fixed on the boss of a bevel wheel 8 which latter revolves loosely on the road axle 7. Keyed on to the road axle 7 there is a nonrotating bevel wheel 9 of corresponding pitch and diameter to the bevel wheel 8. Gearing with these bevel wheels 8, 9 there is a bevel pinion 10 which is mounted on a pin 11 fixed to a bracket 12 cast on the back of the internally toothed spur wheel 13 which latter is mounted to revolve loosely about the road axle 7. Gearing with this internally toothed bevel wheel 13 there are two spur pinions marked respectively 14 and 15 of which the spur pinion 14 is of smaller diameter than the pinion 15. Cast with the pinion 14 there is a bevel wheel 16 which gears with the corresponding bevel wheel 17 mounted to slide on the axle 18 of the driving reel or spider B, this pinion 17 being connected to a bracket 19 on a sliding clutch bar 20 by which the bevel wheel 17 can be slid along the shaft 18 into or out of gear with the bevel wheel 16. The bevel wheel 17 engages with a feather 21 when in gear with the bevel wheel 16. The spur pinion 15 is cast with a bevel wheel 22 which is adapted to gear with the corresponding bevel wheel 23 which is mounted to slide on the axle 18 of the driving reel or spider B and the boss of this bevel wheel 23 engages with a bracket 24 on the clutch bar 20 so that by sliding this clutch bar 20 the bevel wheels 17 and 23 will be slid along the shaft 18 together in the one or the other direction so that either the bevel wheels 16 and 17 will be in gear as in Fig. 1 to drive the reels and rake bars quickly for tedding, the machine then traveling toward the right hand of Fig. 1 with the rake bars behind the road wheels, the bevel wheels 22, 23 being out of gear, or the bevel wheels 22, 23 will be in gear and the bevel wheels 16, 17 are out of gear when the machine is traveling toward the left hand in Fig. 1 for side raking or for swath turning. The bevel wheel 23 when in gear with the bevel wheel 22 engages with a feather 25 on the reel axle 18. The axle 18 is conveniently carried and adapted to revolve in a long boss or bearing 26 of the bracket 27 which is fixed on the non-rotating road axle 7 and is also provided with guide brackets 28 which carry the sliding reversing bar 20. The axle 18 of the driven spider B is also further supported by the bearing bracket 29 which is fixed to the cross bar 30 of the machine frame F.

Instead of the differential gear we may use any suitable arrangement of double clutches which will drive the axle 18 of the reel or spider B in the same direction no matter in whichever direction the machine is being drawn.

The frame F of the machine is so constructed that the harness shafts G can be attached either at the front, as shown in full lines in Fig. 1 to draw the machine forward for side raking or swath turning, or to be attached at the back as shown in dotted lines in Fig. 1 when drawing the machine in the opposite direction for tedding. The driver's seat is also made reversible in position to suit the shafts.

It is to be understood that we do not confine ourselves in the exact details as described and illustrated as for instance the tines may be attached to the higher or bridge portion of the rake bars in any convenient manner and the said rake bars may be arranged in front of or behind the road wheels as desired.

What we claim as our invention and desire to secure by Letters Patent is:—

A side delivery rake of the type wherein a series of rake bars are carried by and between two eccentrically placed revolving reels or equivalents and have combined rotary and endwise movements imparted to them across the path of the machine the tines always pointing toward the ground at every part of their revolution, each of the said rake bars being formed with a gap or bridge at about its center and above its points of suspension and having tines only at each side of the said gap or bridge to serve for swath turning, in combination with one or more make-up pieces furnished with tines to be fixed to the rake bar across the said bridge or gap to then form a continuous rake bar for side raking or tedding, substantially as set forth.

In testimony whereof we affix our signatures in presence of two witnesses.

JOSEPH BAMFORD.
CYRIL JOSEPH BAMFORD.

Witnesses:
CHARLES BOSWORTH KETLEY,
BERTHA MATILDA DEELEY.

Copies of this patent may be obtained for five cents each, by addressing the "Commissioner of Patents, Washington, D. C."